United States Patent
Nagaoka et al.

(10) Patent No.: US 6,823,947 B2
(45) Date of Patent: Nov. 30, 2004

(54) WALK-BEHIND CULTIVATOR

(75) Inventors: Masatoshi Nagaoka, Waki (JP);
Hideaki Kobayashi, Wako (JP);
Yoshitaka Ohta, Wako (JP); Fumiyoshi Kanbara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/339,086

(22) Filed: Jan. 9, 2003

(65) Prior Publication Data

US 2003/0132012 A1 Jul. 17, 2003

(30) Foreign Application Priority Data

Jan. 16, 2002 (JP) ..................................... 2002-008013
Oct. 25, 2002 (JP) ..................................... 2002-311020

(51) Int. Cl.[7] ............................................. A01B 33/00
(52) U.S. Cl. ........................................ 172/42; 172/123
(58) Field of Search .............................. 172/42, 43, 41, 172/118, 119, 122, 123, 125

(56) References Cited

U.S. PATENT DOCUMENTS

| | | | | |
|---|---|---|---|---|
| 2,998,082 A | * | 8/1961 | Arnot | ........................ 172/42 |
| 3,139,049 A | * | 6/1964 | Brown | ........................ 111/131 |
| 4,214,632 A | * | 7/1980 | Brookshier | ................... 172/42 |
| 4,396,067 A | * | 8/1983 | Enters et al. | ................. 172/42 |
| 4,678,042 A | * | 7/1987 | Barton et al. | ................ 72/15.1 |
| 4,939,854 A | * | 7/1990 | Boren | ........................... 37/94 |
| 5,520,253 A | * | 5/1996 | Kesting | ...................... 172/125 |

FOREIGN PATENT DOCUMENTS

| | | |
|---|---|---|
| EP | 0774200 | 5/1997 |
| FR | 2689363 | 10/1993 |
| FR | 2798037 | 3/2001 |
| JP | 5697903 | 8/1981 |
| JP | 083817704 | 12/1996 |
| JP | 01069803 | 3/2001 |

* cited by examiner

Primary Examiner—Christopher J. Novosad
(74) Attorney, Agent, or Firm—Adams & Wilks

(57) ABSTRACT

A walk-behind cultivator has a body, at least one pair of first tine assemblies mounted on the body to undergo rotation about a rotational axis in a first direction of rotation, and at least one pair of second tine assemblies mounted to undergo rotation about the rotational axis in a second direction of rotation different from the first direction of rotation. Each of the first tine assemblies has first tines connected together along end portions thereof. Each of the second tine assemblies has second tines connected together along end portions thereof. The second tine assemblies are arranged in the same phase with respect to each other around the rotational axis.

13 Claims, 16 Drawing Sheets

WALK-BEHIND CULTIVATOR

FIELD OF THE INVENTION

The present invention relates to an improvement in walk-behind cultivators.

BACKGROUND OF THE INVENTION

Common walk-behind cultivators operate by rotation of tillage tines provided on rotor shafts, being propelled with the tillage tines. Those cultivators are called front-tine cultivators. In recent years, however, front-rotary cultivators, that is, walk-behind cultivators with tillage tines arranged forward of the bodies provided with driving wheels have been developed.

Having the tillage tines at the front of the bodies, the front-rotary cultivators facilitate cultivation in headlands, allowing operators to look forward during operation, providing good workability, and thus attracting attention (See, e.g., Japanese Patent No. 3015821 and Japanese Utility Model Laid-Open Publication No. SHO-56-97903).

The words "headlands" mean areas left unplowed by a cultivator cultivating a rectangular-shaped field, moving back and forth in parallel with one side thereof, for example, because it temporarily stops working at the opposite ends of the field for turning or the like.

A cultivator in Japanese Patent No. 3015821 is called a down-cut cultivator with tillage tines rotated from the upper front of a traveling direction toward the ground and is mainly used to break up soil.

A cultivator in Japanese Utility Model Laid-Open Publication No. SHO-56-97903 is called an up-cut cultivator with tillage tines rotated from the upper rear of a traveling direction toward the ground and is mainly used to weed a field.

As an example of such front-rotary cultivators, the cultivator of Japanese Patent No. 3015821 will be generally described with reference to FIG. 16 hereof.

A front-rotary cultivator 200 shown in FIG. 16 is a walk-behind cultivator with a transmission case 203 provided below a body 202 to which an engine 201 is mounted, the transmission case 203 being integrally molded with a rear mission case 204 and a front rotary case 205, a pair of left and right driving wheels 207, 207 mounted on an axle 206 protruded from a rear portion of the mission case 204, a rotary countershaft 208 provided in a front portion of the mission case 204, a plurality of tillage tines 210 mounted on a rotor shaft 209 protruded from a front portion of the rotary case 205, and a chain 213 running in the rotary case 205 between a driving sprocket 211 of the rotary countershaft 208 and a driven sprocket 212 of the rotor shaft 209.

The engine 201 is a horizontal engine with an output shaft 214 protruded laterally. A belt 218 runs between a driving pulley 215 mounted on the output shaft 214 and a driven pulley 217 mounted on an input shaft 216 protruded from the side of the mission case 204 to transmit the power of the engine 201 to the transmission. The power of the engine 201 can thus drive the pair of left and right driving wheels 207, 207 via the axle 206 and drive the tillage tines 210 via the rotary countershaft 208, chain 213 and rotor shaft 209.

The tillage tines 210 of the front-rotary cultivator 200 are arranged in four rows across the width of the body 202 (across the two sides of the figure sheet). All the tillage tines 210 rotate with the rotor shaft 209 in one direction for cultivation. Reference numeral 219 denotes a tension roller as a main clutch and 220 a handle bar.

Cultivation with the tillage tines 210 can cause a so-called dashing phenomenon (or jumping phenomenon) in which the cultivation reaction force causes the tillage tines 210 to bound upward. The dashing phenomenon caused reduces the linearity in travel of the cultivator 200, resulting in insufficient cultivation performance and poor finish of cultivation. This tendency is more noticeable especially as the cultivator 200 is lighter in weight.

The above conventional art arranges the engine 201 between the rear axle 206 and the front rotor shaft 209 to shift the center of gravity of the cultivator 200 forward, thereby to apply part of the weight of the engine 201 to the tillage tines 210. As a result, the degree of digging of the tillage tines 210 into the ground Gr21 can be somewhat increased and the occurrence of the dashing phenomenon can be somewhat prevented.

Only with such a structure, however, there is a limit to the increase in degree of digging of the tillage tines 210 and the prevention of the dashing phenomenon. To solve the problem, it seems possible to arrange the engine 201 or a heavy load such as a counterweight in front of or above the tillage tines 210 to increase the distribution of weight to the tillage tines 210. The center of gravity of the cultivator 200 is, however, too much offset forward, making the handle bar 220 heavier. Especially in the operation of pushing down the handle bar 220 to lift the tillage tines 210 to turn the cultivator 200, the pushing-down force is increased, reducing the operability. Only changing the center of gravity of the cultivator 200 forward thus inexpediently increases the workload of the operator.

Thus desired is a front-rotary cultivator with tillage tines arranged at the front of the body equipped with driving wheels, being able to prevent the occurrence of the dashing phenomenon, increase cultivation performance and also reduce the workload of the operator.

SUMMARY OF THE INVENTION

According to the present invention, there is provided a walk-behind cultivator, which comprises: a body; an engine provided on the body; left and right driving wheels provided to the body and driven by the engine; and a plurality of tillage tines provided at the front of the body and driven by the engine, the tillage tines comprising: a plurality of forward-rotating tines arranged in the center of the width of the body; and a plurality of reverse-rotating tines arranged outward of the forward-rotating tines in the transverse direction of the body, the reverse-rotating tines being arranged in the same phase in a side view.

Arranging the forward-rotating tines of the tillage tines in the center of the body width and arranging the reverse-rotating tines transversely outward of the forward-rotating tines allow the forward-rotating tines to (forwardly) rotate from the upper front of the traveling direction toward the ground and the reverse-rotating tines to (reversely) rotate from the upper rear of the traveling direction toward the ground.

The direction of the cultivation reaction forces against the forward-rotating tines is forward and upward of the traveling direction of the walk-behind cultivator, that is, opposite to the rotation direction of the forward-rotating tines. The direction of the cultivation reaction forces against the reverse-rotating tines is rearward of the traveling direction of the walk-behind cultivator, that is, opposite to the rotation direction of the reverse-rotating tines. The cultivation reaction forces against the forward-rotating tines and the cultivation reaction forces against the reverse-rotating tines act in opposite directions.

When all the tillage tines are forward-rotating tines, the cultivation reaction force is larger, making it difficult to prevent the occurrence of a dashing phenomenon due to the cultivation reaction force. In this invention, the cultivation reaction force arising from cultivation with the forward-rotating tines can be cancelled to some extent by the cultivation reaction force arising from cultivation with the reverse-rotating tines. As a result, the occurrence of a dashing phenomenon can be prevented.

With the walk-behind cultivator being propelled, the forward-rotating tines in the center of the body width can rotate forward to dig into the ground for cultivation, digging out the cultivated soil rearward of the cultivator body.

Arranging the reverse-rotating tines in the same phase in a side view allows the reverse-rotating tines arranged transversely outward of the forward-rotating tines to rotate reversely, with the walk-behind cultivator being propelled, to simultaneously dig into the ground, digging out the cultivated soil forward of the cultivator body.

Simultaneous digging of the reverse-rotating tines into the ground can also increase the degree of digging as compared with differential digging. As a result, the depth of plowing with the reverse-rotating tines is increased, increasing cultivation performance.

Simultaneous digging of the reverse-rotating tines into the ground can make the cultivation reaction forces against the reverse-rotating tines approximately equal. The approximately equal cultivation reaction forces can prevent the unbalanced occurrence of a dashing phenomenon and also prevent the occurrence of a pitching phenomenon (phenomenon in which the cultivator swings back and forth like a seesaw). This prevents snaking of the cultivator, increasing its travel linearity, steerage and workability, and improving cultivation finish.

Even when the cultivator has a light weight, it is not necessary to dispose the engine or a heavy load such as a counterweight in front of or above the tillage tines, increasing the weight distribution to the tillage tines so as to increase the degree of digging of the tillage tines to prevent a dashing phenomenon. Therefore, in the operation of pushing down an operating handle to lift the tillage tines during turn of the cultivator, the pushing down force is not increased. This can reduce the workload of the operator, increasing steerage.

In this invention, the forward-rotating tines are preferably arranged in the same phase in a side view.

Arranging the forward-rotating tines in the same phase in a side view and arranging the reverse-rotating tines in the same phase in a side view allow the forward-rotating tines in the center of the body width to, with the walk-behind cultivator being propelled, forwardly rotate to simultaneously dig into the ground for cultivation, digging out the cultivated soil rearward of the cultivator body. The reverse-rotating tines arranged transversely outward of the forward-rotating tines are allowed to rotate reversely to simultaneously dig into the ground, digging out the cultivated soil forward of the cultivator body.

The simultaneous digging of the forward-rotating tines into the ground can increase the degree of digging as compared with differential digging. The simultaneous digging of the reverse-rotating tines into the ground can also increase the degree of digging. This results in an increase in the depth of plowing with the forward-rotating tines and the reverse-rotating tines, further increasing cultivation performance.

Further, simultaneous digging of the forward-rotating tines into the ground can make the cultivation reaction forces against the forward-rotating tines approximately equal. The same applies to the reverse-rotating tines. The approximately equal cultivation reaction forces allow further prevention of the unbalanced occurrence of a dashing phenomenon and also allow prevention of the occurrence of a pitching phenomenon (phenomenon in which the cultivator swings back and forth like a seesaw).

Furthermore, the simultaneous digging of the forward-rotating tines into the ground with the simultaneous digging of the reverse-rotating tines into the ground can make approximately equal the left and right cultivation reaction forces acting on the cultivator. This also enables preventing the occurrence of a rolling phenomenon (phenomenon in which the cultivator rolls around the longitudinal axis passing through the center of gravity of the cultivator). This can further prevent snaking of the cultivator, increasing travel linearity and steerage, further increasing the workability, and also improving cultivation finish.

Further, in this invention, the left and right driving wheels are preferably arranged rearward of the reverse-rotating tines. In the cultivator of the present invention adopting the front-rotary system, the driving wheels are arranged rearward of the tillage tines. Arranging the driving wheels rearward of the reverse-rotating tines to dig out the cultivated soil forward of the cultivator body allows the driving wheels to run over the ground dug down with the reverse-rotating tines. This can increase the degree of settling of the driving wheels, maintaining the cultivator horizontally. Thus stable cultivation is provided. Since the position of the engine is also horizontal, the oil surface of a lubricant in the engine is not slanted. Thus smooth lubrication of the engine is provided.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
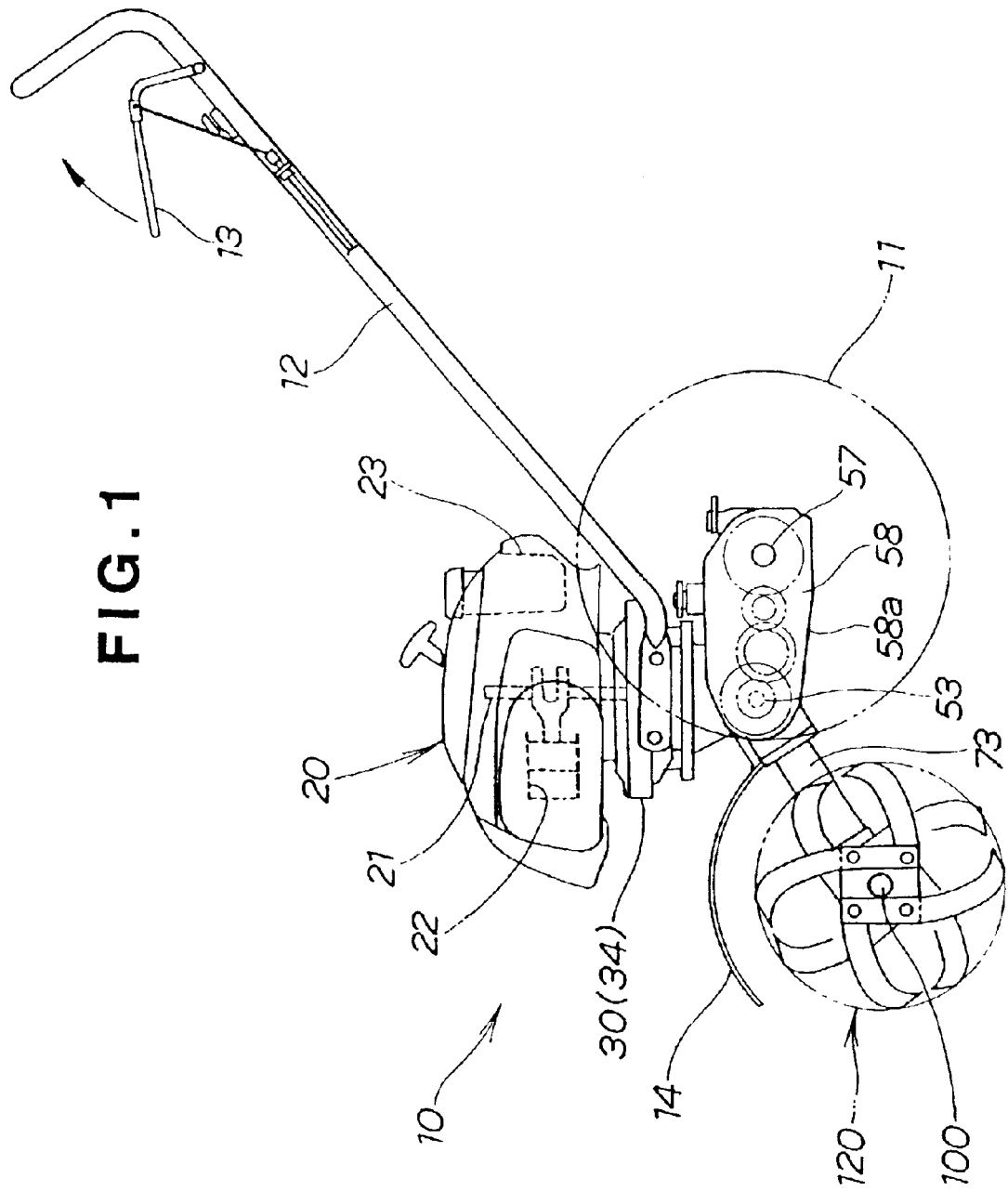
FIG. 1 is a left side view of a front-rotary cultivator according to the present invention.
Figure 7:
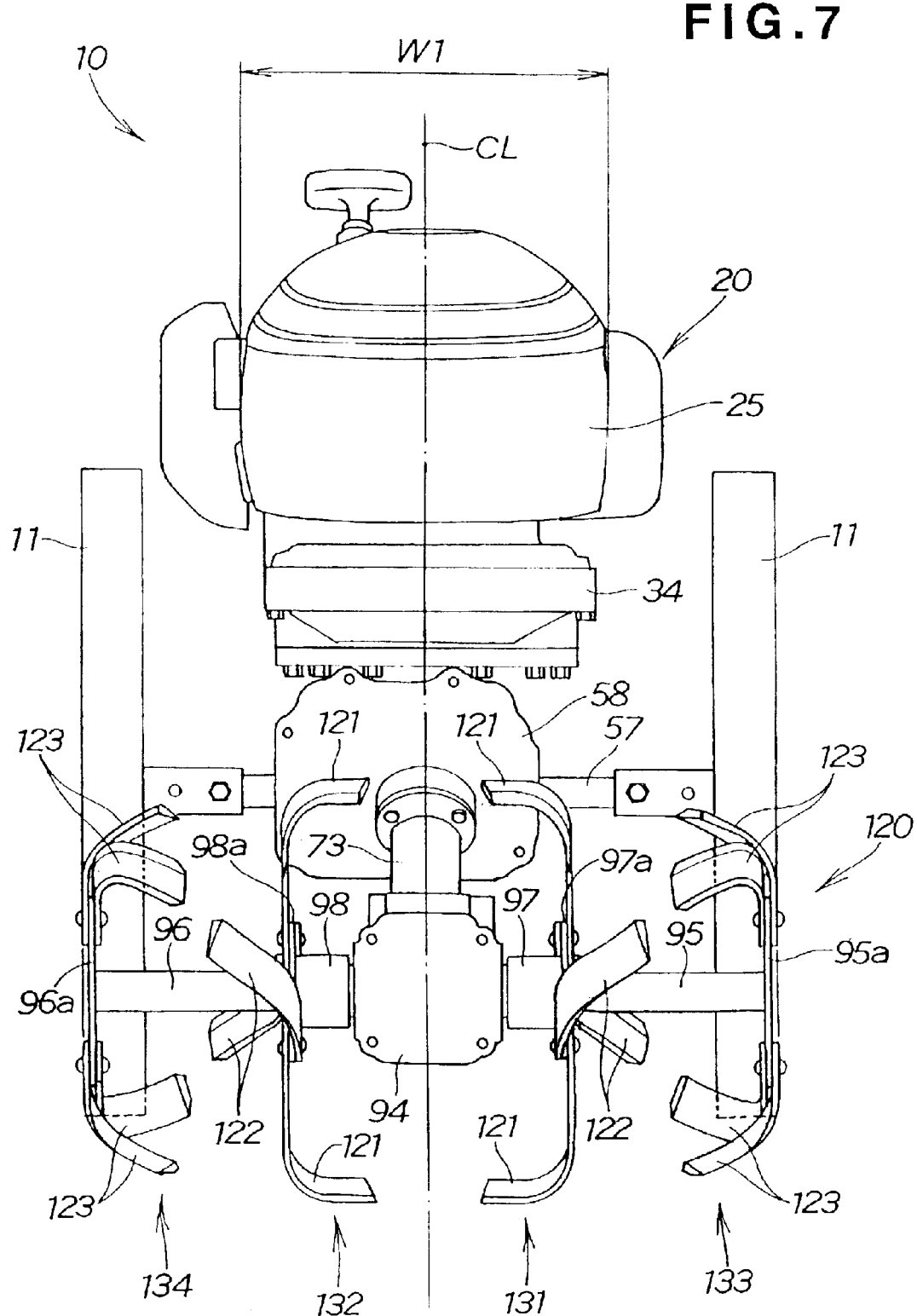
FIG. 7 is a front view of the front-rotary cultivator according to the invention.

A front-rotary cultivator 10 shown in FIG. 1 is a small walk-behind self-propelled cultivator with a rotary working unit 120 arranged at the front of a transmission case 58 provided with left and right driving wheels 11, 11 (See FIG. 7).

Specifically, the front-rotary cultivator (hereinafter referred to merely as a "cultivator") 10 is a walk-behind cultivator with the driving wheels 11, 11 provided at the transmission case 58 as the body and with the rotary working unit 120 provided at the front of the transmission case 58. The driving wheels 11 and the rotary working unit 120 are driven by an engine 20 provided on the transmission case 58.

More specifically, FIG. 1 shows that the transmission case 58 is arranged below the engine 20 via a main clutch 30 and output shafts 53 and 57 are protruded from front and rear portions of the transmission case 58. The front output shaft (rotary countershaft) 53 drives the rotary working unit 120 and the rear output shaft (axle) 57 drives the driving wheels 11. It is thus possible to arrange the driving wheels 11, 11 at the rear of the transmission case 58 and arrange the rotary working unit 120 at the front of the transmission case 58.

The engine 20 as a power source is a vertical engine having an output shaft (crankshaft) 21 oriented substantially vertically, cylinders 22 extended substantially horizontally forward, and an oil tank 23 provided at its rear.

The cultivator 10 has an operating handle 12 extended from the rear of a clutch case 34 of the main clutch 30 in a rearward and upward direction. The operating handle 12 is provided with a clutch lever 13. The clutch lever 13 is for operating the main clutch 30. In the figure, reference numeral 14 denotes a soil scattering-prevention cover.

Figure 2:
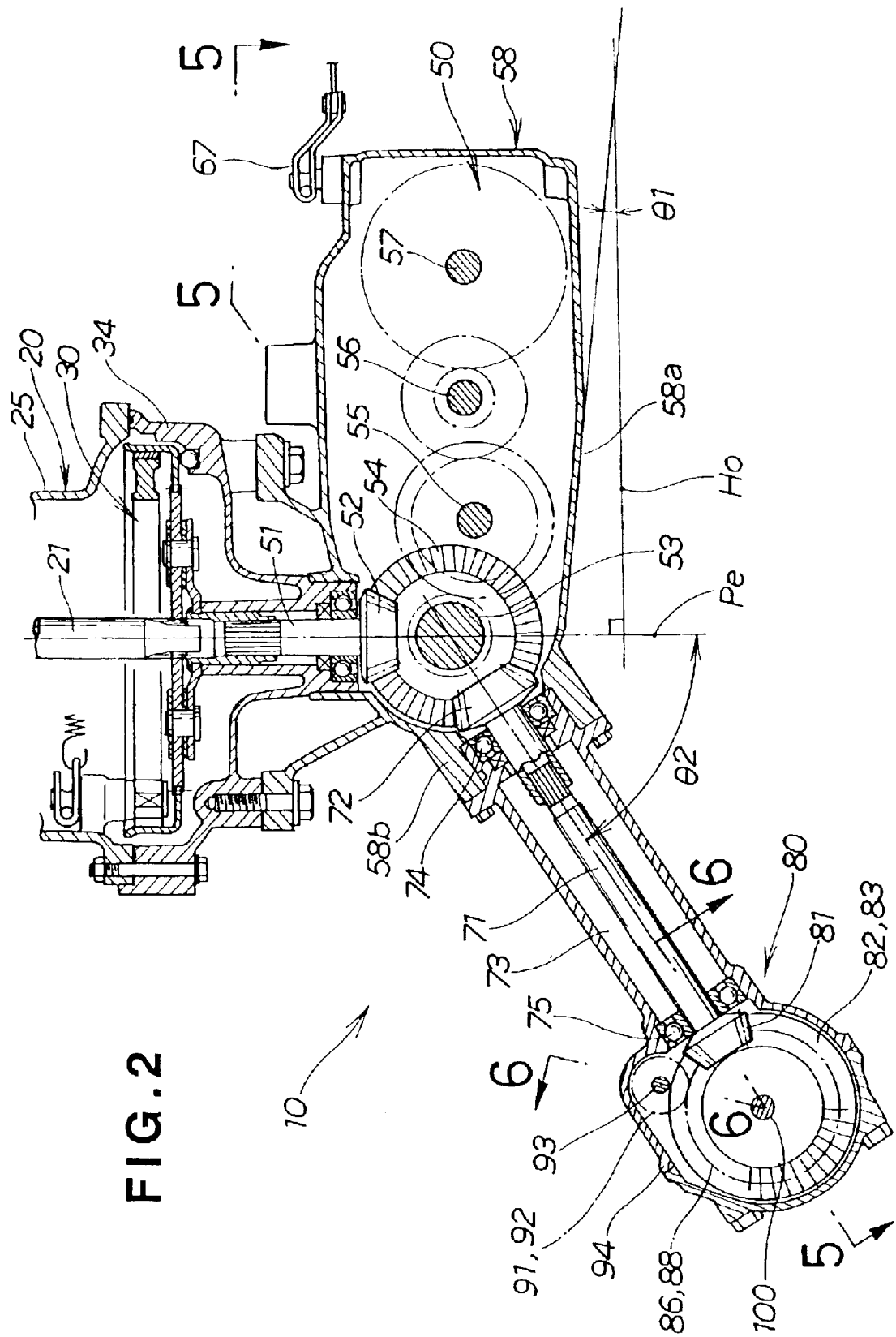
FIG. 2 is a cross-sectional view of an engine, a main clutch, a transmission case and the surroundings according to the invention.

FIG. 2 is a cross-sectional view of an engine, a main clutch, a transmission case and the surroundings according to the present invention taken from the left side, showing the configuration in which the output shaft 21 of the engine 20 is protruded downward and a transmission 50 is coupled to the lower end of the output shaft 21 via the main clutch 30.

The upper end of the clutch case 34 is bolted to the lower end of a body 25 of the engine 20 and the transmission case 58 of the transmission 50 is bolted to the lower end of the clutch case 34, so that the clutch case 34 and the transmission case 58 serve as the cultivator body.

Figure 3:
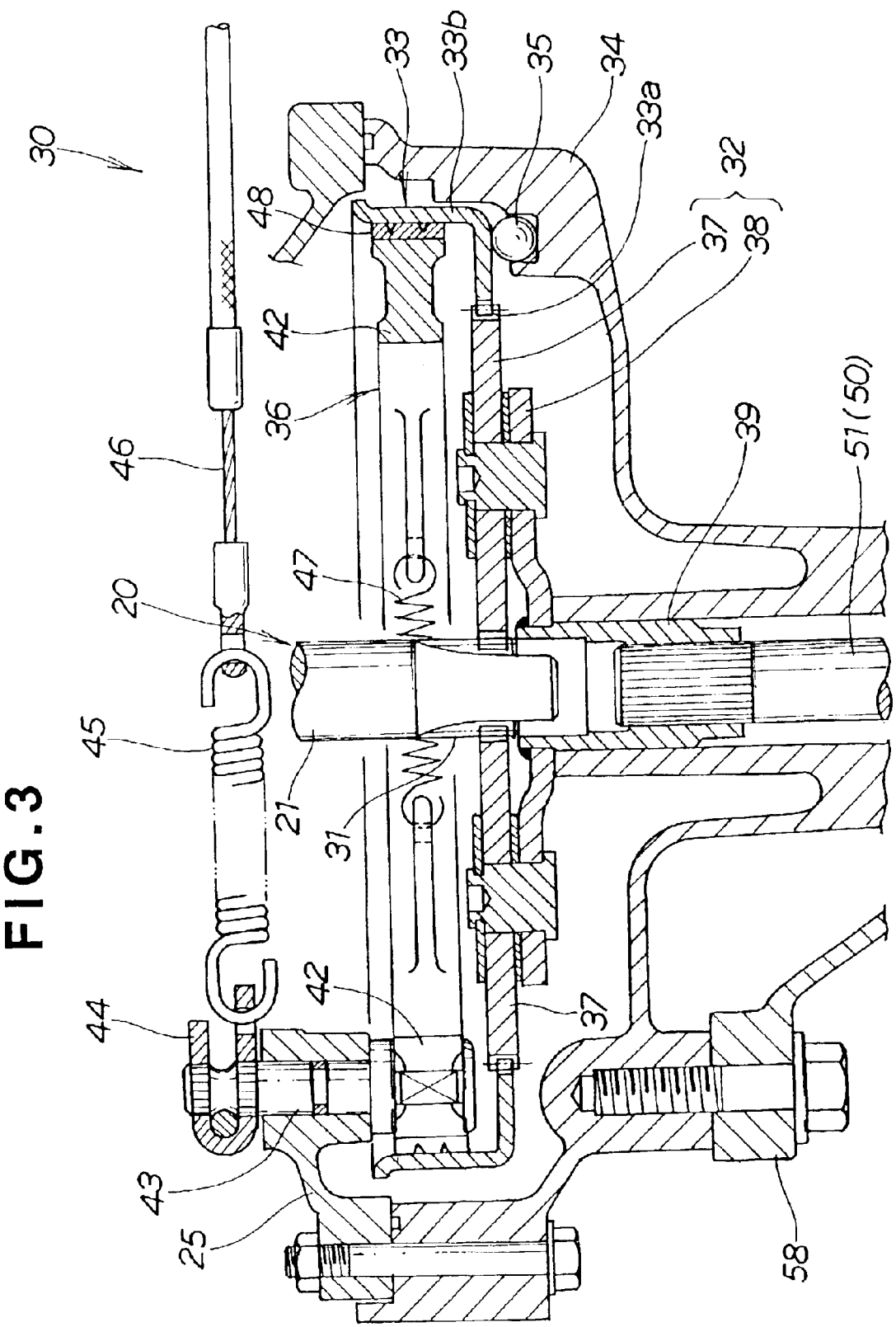
FIG. 3 is a cross-sectional view of the main clutch according to the invention.

FIG. 3 shows in section the main clutch 30 shown in FIG. 2.

The main clutch 30 includes a sun gear 31 mounted on the output shaft 21 of the engine 20, a planet gear assembly 32 engaged with the sun gear 31, an internal gear 33 engaged with the planet gear assembly 32, the clutch case 34 housing the sun gear 31, planetary gear assembly 32 and internal gear 33, a plurality of balls 35 interposed between the internal gear 33 and the clutch case 34, and a brake 36 for locking/unlocking the internal gear 33.

The planet gear assembly 32 includes a plurality of planet gears 37 engaged with the sun gear 31 and the internal gear 33, and a planet frame 38 rotatably supporting the planet gears 37. The planet frame 38 is at its center provided with a coupling 39 spline-coupled to an input shaft 51 of the transmission 50.

The internal gear 33 includes teeth 33a engaged with the planet gears 37 and a cylinder 33b to which the brake 36 is applied. The cylinder 33b serves as a brake drum. The balls 35 are support members for supporting the internal gear 33.

Figure 4:
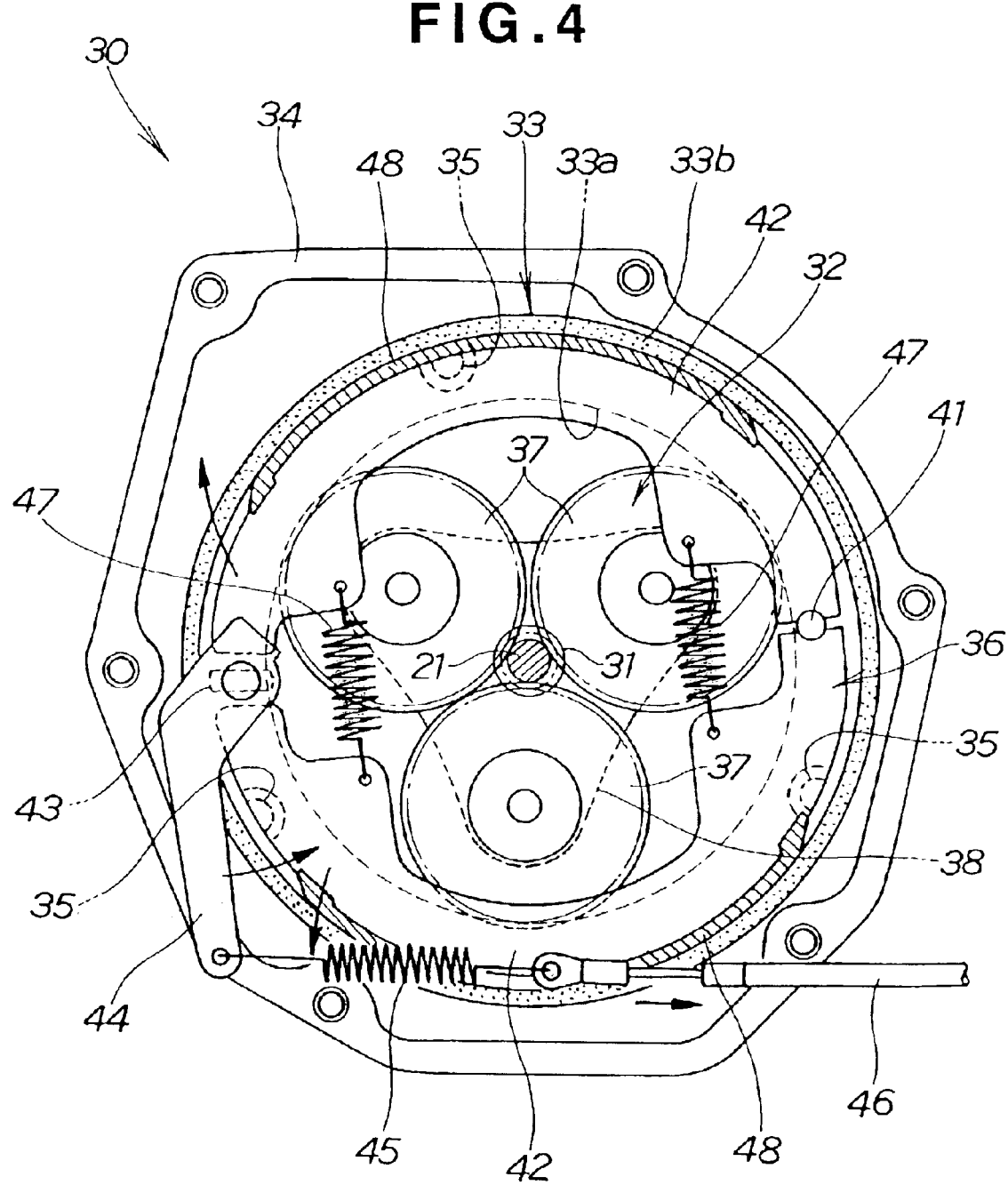
FIG. 4 is a plan view of the main clutch according to the invention.

As shown in FIG. 4, the brake 36 of the main clutch 30 includes an anchor pin 41 mounted to the clutch case 34, a pair of brake shoes 42, 42 supported by the anchor pin 41, a working cam 43 for expanding the brake shoes 42, 42, a lever 44 coupled to the working cam 43, and a cable 46 coupled to the lever 44 via an extension spring 45.

The brake shoes 42, 42 are provided with return springs 47, 47 resiliently pulling them toward one another and brake pads 48, 48 to lock the internal gear 33. The cable 46 is coupled to the clutch lever 13 (See FIG. 1).

Now the function of the main clutch 30 will be described with reference to FIG. 3.

In the state shown in FIG. 3, the brake 36 is released and the internal gear 33 is rotatable. When the sun gear 31 is rotated with the output shaft 21 of the engine 20, the planet gears 37 are rotated. At this time, the internal gear 33, being in a free state, rotates. As a result, the planet frame 38 is not rotated. The main clutch 30 thus maintains a so-called clutch-off state in which no power of the engine 20 is transmitted from the output shaft 21 to the input shaft 51 of the transmission 50.

Thereafter, when the clutch lever 13 (See FIG. 1) is operated to pull the cable 46, the brake 36 is turned on. The internal gear 33 is prevented from rotating. When the sun gear 31 is rotated, the planet gears 37 are rotated. At this time, the internal gear 33, being in a locked state, is not rotated. As a result, the planet frame 38 is rotated. The main clutch 30 is thus switched to a so-called clutch-on state in which the power of the engine 20 is transmitted from the output shaft 21 to the input shaft 51 of the transmission 50. When the clutch lever 13 is released, the main clutch 30 is automatically returned to the former clutch-off state.

Here the reference is once returned to FIG. 2 to continue the description. The input shaft 51 of the transmission 50 is concentric with the output shaft 21 of the engine 20. A driving bevel gear 52 provided at the lower end of the input shaft 51 is engaged with a first driven bevel gear 54 provided on the rotary countershaft 53 to transmit power from the input shaft 51 to the rotary countershaft 53.

The transmission 50 has the rotary countershaft 53, a first countershaft 55, a second countershaft 56 and an axle 57 horizontally arranged across the body width from the front to the rear in this order. The shafts and axle 53, 55, 56 and 57 are coupled to one another with gear mechanisms. The transmission case 58 of the transmission 50 can thus be made longitudinally longer and transversely narrower (across the two sides of the figure sheet). The transmission case 58 can also be smaller in height (thinner).

A bottom surface 58a of the transmission case 58 is flat and substantially parallel with the ground. More specifically, with a center line Pe of the output shaft 21 of the engine 20 as a vertical line, the bottom surface 58a is made substantially parallel with a horizontal line Ho perpendicular to the vertical line Pe. The horizontal line Ho is parallel with the ground.

A front portion of the bottom surface 58a of the transmission case 58 is sloped rearward. The inclination angle θ1 of the bottom surface 58a with respect to the horizontal line Ho is a very small angle of about 5 degrees.

The cultivator 10 has a transmission shaft 71 coupling the rotary countershaft 53 to the rotary working unit 120 (See FIG. 1). The transmission shaft 71 is covered by a tubular case 73 attached to the transmission case 58.

More specifically, a first driven bevel gear 54 provided on the rotary countershaft 53 is engaged with a second driven bevel gear 72 provided on the transmission shaft 71 which is extended forwardly and downwardly toward a rotor shaft 100. The transmission shaft 71 is rotatably supported on bearings 74 and 75 to the tubular case 73, and the proximal end of the tubular case 73 is bolted to a mounting eye 58b of the transmission case 58. With respect to the center line Pe of the output shaft 21, the inclination angle θ2 of the transmission shaft 71 and the tubular case 73 is about 60 degrees.

Since the thin transmission case 58 is used as described above, the height from the rotor shaft 100 to the bottom surface 58a of the transmission case 58 is relatively larger. The height of the bottom surface 58a from the ground is thus increased as compared with that of a conventional one.

The tubular case 73 consists of a cylinder and is provided with a housing case 94 integrally formed at its front end. The housing case 94 is a split case demountable relative to the center of the rotor shaft 100.

As will be clear from the above description, arranging the vertical engine 20 between the rear axle 57 and the front rotor shaft 100 to shift the center of gravity of the cultivator 10 forward enables applying part of the weight of the engine 20 to the rotary working unit 120 (See FIG. 1).

The output shaft 21 of the engine 20 is vertically arranged concentrically with the input shaft 51 of the transmission 50. In a conventional cultivator, a horizontal engine with an output shaft laterally protruded is used and a belt runs between the output shaft of the engine and an input shaft of a transmission. In the present invention, the engine 20 can be made close to the upper surface of the transmission case 58. Thus reducing the height of the engine 20 enables lowering the center of gravity of the cultivator 10.

Figure 5:
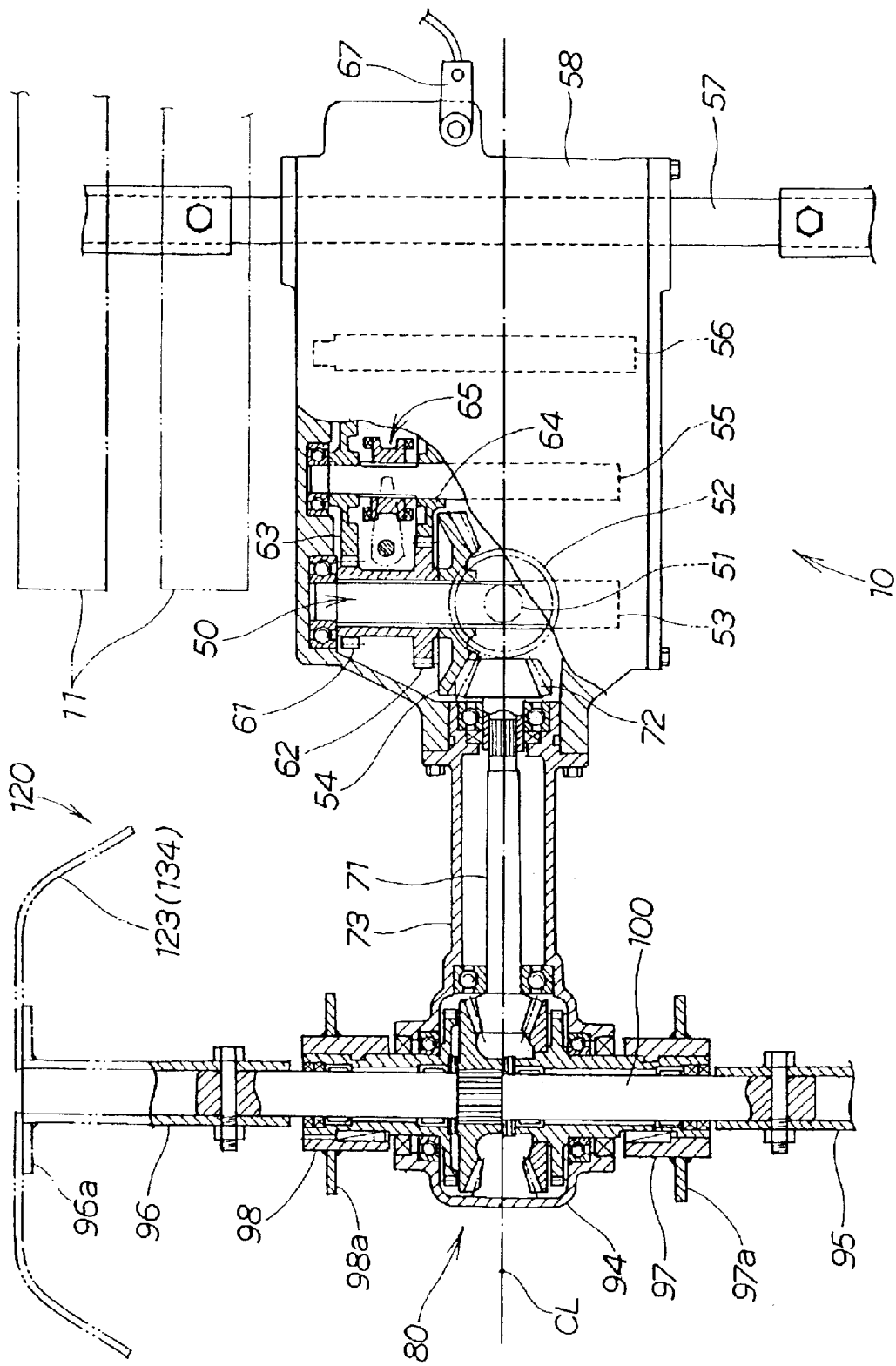
FIG. 5 is a cross-sectional view taken along line 5—5 in FIG. 5.

FIG. 5 is a cross-sectional view taken along line 5—5 in FIG. 2, showing in section part of the transmission case 58.

A first driving spur gear 61 and a second driving spur gear 62 are provided on the rotary countershaft 53. A first driven spur gear 63, a second driven spur gear 64 and a dog clutch 65 are provided on the first countershaft 55. The dog clutch 65 is switched to enable switching between release of power transmission from the rotary countershaft 53 to the axle 57 via the first countershaft 55 and high-speed or low-speed power transmission from the rotary countershaft 53 to the axle 57 via the first countershaft 55. In the figure, reference numeral 67 denotes a selector lever.

FIG. 5 shows that the transmission case 58 is longitudinally long and transversely narrow. The narrow width of the transmission case 58 allows the driving wheels 11 shown in imaginary lines to be made close to the center CL of the body width or be distanced outwardly from the center CL of the body width.

Figure 6:
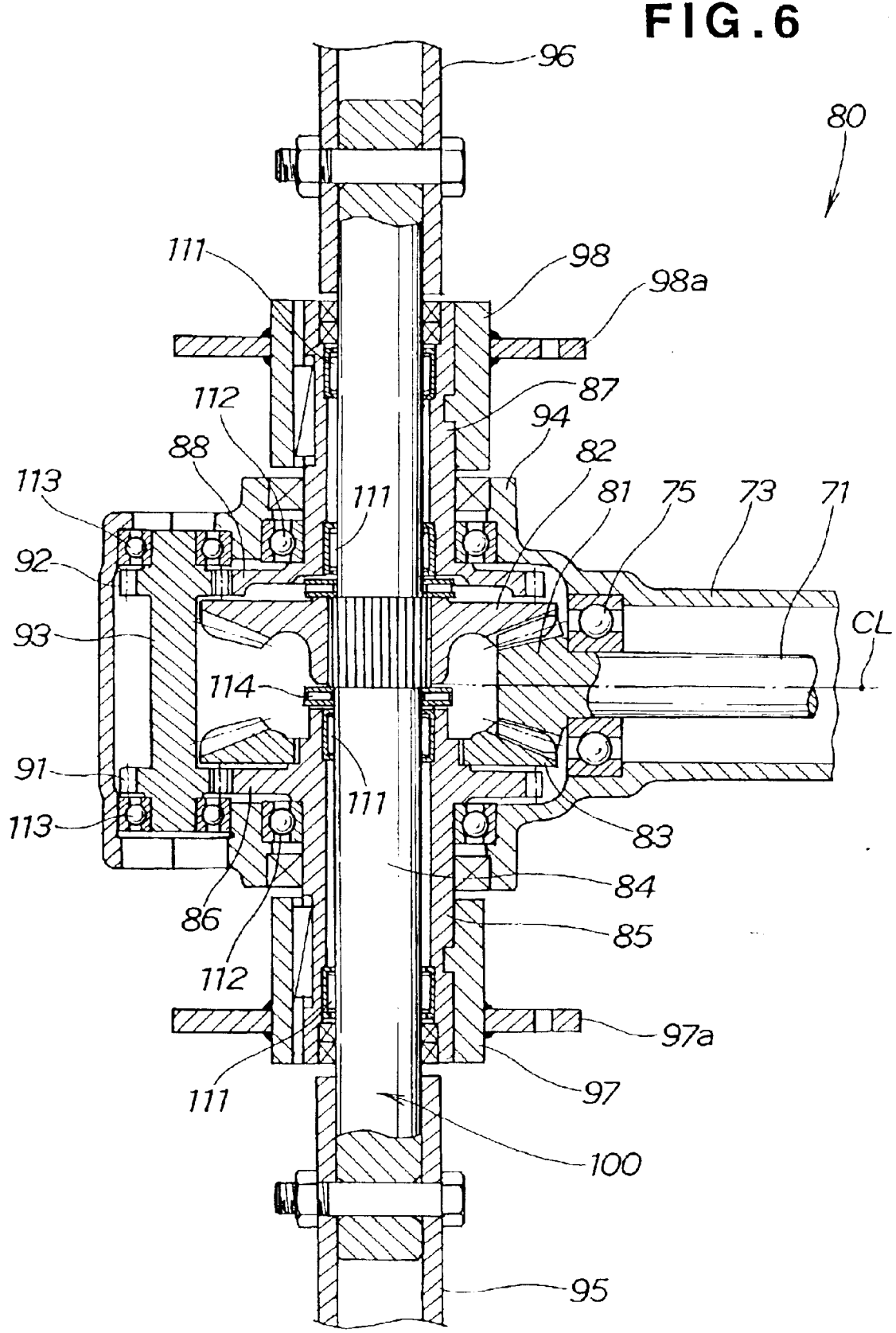
FIG. 6 is a cross-sectional view taken along line 6—6 in FIG. 2.

FIG. 6 is a cross-sectional view taken along line 6—6 in FIG. 2, showing in section a cultivation power transmission mechanism 80 for transferring power from the transmission to the rotor shaft 100, and the surroundings. The rotor shaft 100 extends horizontally across the body width and includes a main rotor shaft 84, a left hollow shaft 85 and a right hollow shaft 87.

The cultivation power transmission mechanism 80 includes the transmission shaft 71 for transmitting the power of the engine 20 (See FIG. 2) to the rotor shaft 100, a first bevel gear 81 provided at the distal end of the transmission shaft 71, a second bevel gear 82 and a third bevel gear 83 arranged in parallel with one another, each engaging the first bevel gear 81, the main rotor shaft 84 integrally provided to the second bevel gear 82, the left hollow shaft 85 relatively rotatably fitted onto the main rotor shaft 84 and integrally provided to the third bevel gear 83, a left gear 86 provided to the left hollow shaft 85 in addition to the third bevel gear 83, the right hollow shaft 87 relatively rotatably fitted onto the main rotor shaft 84 in such a manner as sandwiching the second and third bevel gears 82 and 83 with the left gear 86, a right gear 88 provided to the right hollow shaft 87, a countershaft 93 with gears (a counter left gear 91 and a counter right gear 92) spanning across the left and right gears 86 and 88 so as to mechanically couple the right gear 88 to the left gear 86, and the housing case 94 housing in a lump at least the transmission shaft 71, the first, second and third bevel gears 81, 82 and 83, the left and right gears 86 and 88, and the countershaft 93.

The main rotor shaft 84 is a long solid shaft extending across the body width, with a reverse-rotating left sleeve 95 and a reverse-rotating right sleeve 96 demountably mounted to its left and right ends by bolting or the like. The left hollow shaft 85 is integrally mounted at its left end a forward-rotating left sleeve 97 by keying or the like. The right hollow shaft 87 is integrally mounted at its right end a forward-rotating right sleeve 98 by keying or the like. These sleeves 95 to 98 are hollow shafts. In the figure, reference numerals 111 to 113 denote bearings and 114 a thrust bearing.

FIG. 7 is a front view of the front-rotary cultivator according to the present invention, showing that the engine 20, the clutch case 34, the transmission case 58, and the tubular case 73 are arranged along the center CL of the body width, and the clutch case 34 and the transmission case 58 are fallen within the body width W1 of the engine 20.

The rotary working unit 120 is an assembly of a plurality of tillage tines. The tillage tines consist of a plurality of forward-rotating tines 121 and 122 (that is, a plurality of first forward-rotating tines 121 and a plurality of second forward-rotating tines 122) and a plurality of reverse-rotating tines 123. The words "tillage tines" are hereinafter used as words collectively meaning the first forward-rotating tines 121, the second forward-rotating tines 122 and the reverse-rotating tines 123. The words "forward-rotating tines 121 and 122" include the first forward-rotating tines 121 and the second forward-rotating tines 122.

The present invention is first characterized in that the forward-rotating tines 121 and 122 of the tillage tines are arranged in the transverse center of the transmission case 58 as the cultivator body, and the reverse-rotating tines 123 are arranged transversely outward of the forward-rotating tines 121 and 122.

More specifically, the rotary working unit 120 has four rows arranged in the transverse direction of the cultivator body, consisting of: ① a group 131 of the forward-rotating tines 121 and 122 attached to a mounting plate 97a of the forward-rotating left sleeve 97 left inside (first tine group 131); ② a group 132 of the forward-rotating tines 121 and 122 attached to a mounting plate 98a of the forward-rotating right sleeve 98 right inside (second tine group 132); ③ a group 133 of the reverse-rotating tines 123 attached to a mounting plate 95a of the reverse-rotating left sleeve 95 left outside (third tine group 133); and ④ a group 134 of the reverse-rotating tines 123 attached to a mounting plate 96a of the reverse-rotating right sleeve 96 right outside (fourth tine group 134).

The left and right driving wheels 11, 11 are arranged rearward of the reverse-rotating tines 123. Specifically, the left driving wheel 11 is arranged rearward of the third tine group 133 and the right driving wheel 11 is arranged rearward of the fourth tine group 134.

As will be clear from the above description, a vertical engine is used as the engine 20 and the output shaft 21 (See FIG. 2) is arranged in the center CL of the body width so as to increase the weight balance in the transverse direction of the cultivator 10. Since the engine 20 is located in the center CL of the width, the left and right driving wheels 11, 11 can be arranged close to the engine 20 in a sandwiching manner to make the driving wheels 11, 11 close to the center CL of the body width.

Figure 8A:
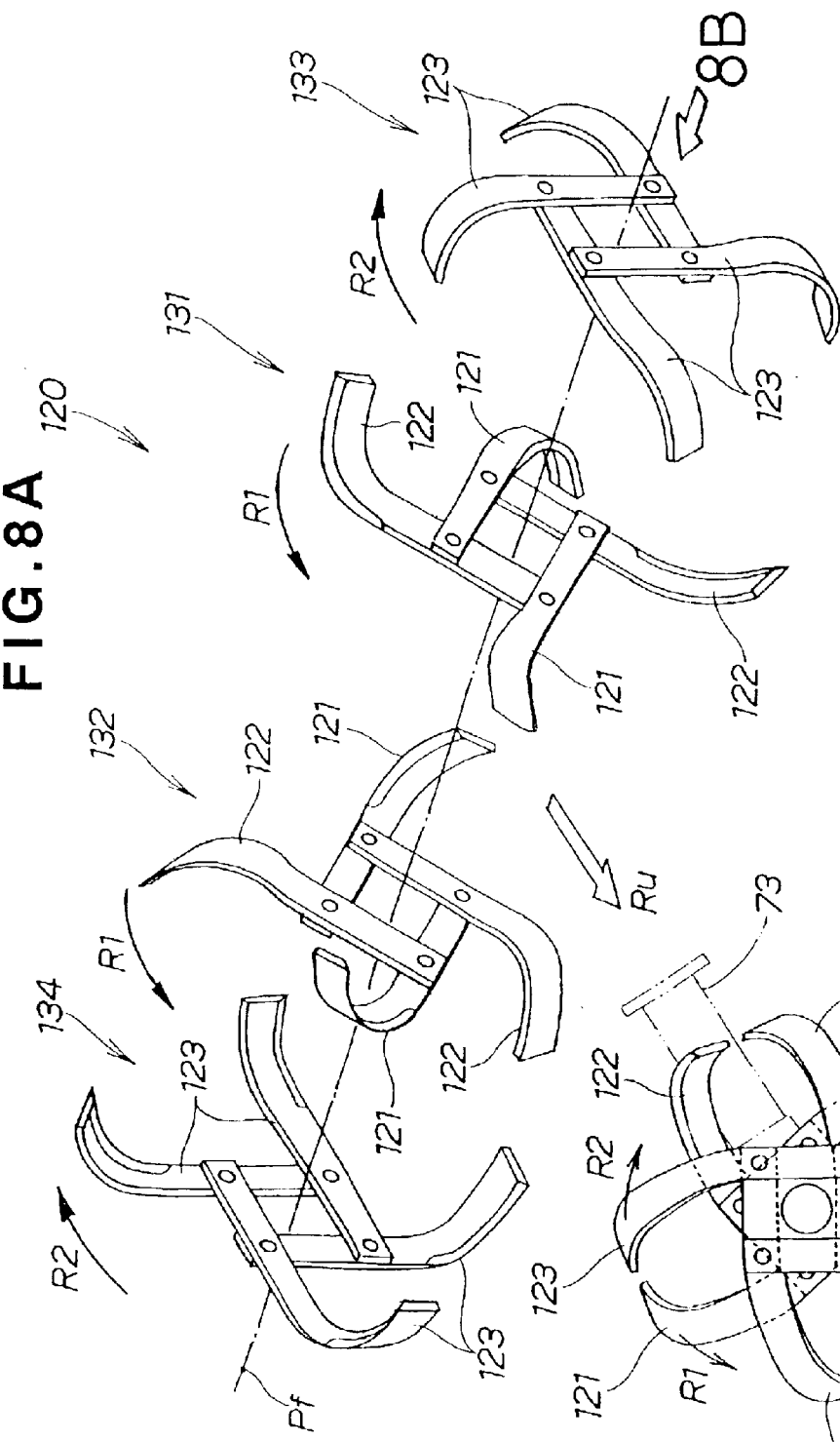
FIGS. 8A and 8B are structural diagrams of a rotary working unit according to the invention.
Figure 8B:
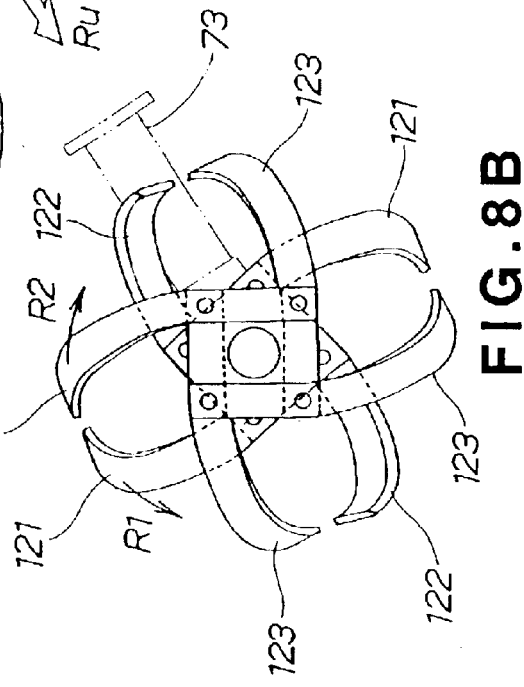

FIGS. 8A and 8B are structural diagrams of the rotary working unit according to the present invention; FIG. 8A is an exploded view of the tillage tines constituting the rotary working unit 120; and FIG. 8B is a view taken from the direction of an arrow 8B in FIG. 8A. For ease of understanding, the mounting plates 95a, 96a, 97a and 98a and the rotor shaft 100 shown in FIGS. 6 and 7 are omitted.

The forward-rotating tines 121 and 122 rotate from the upper front of a traveling direction Ru of the cultivator 10 (See FIG. 7) toward the ground in a direction R1, that is, the forward-rotating direction R1. The reverse-rotating tines 123 rotate from the upper rear of the traveling direction Ru toward the ground in a direction R2, that is, the reverse-rotating direction R2.

The rotary working unit 120 is characterized in that the forward-rotating tines 121 and 122 are arranged in the same phase in a side view and the reverse-rotating tines 123 are arranged in the same phase in a side view. This will be described in detail below.

Each of the first and second tine groups 131 and 132 has the four forward-rotating tines 121 and 122 lapped at their proximal ends to one another to form generally parallel cross-shaped structures or crosses with reference to the center Pf of the rotor shaft. Each of the third and fourth tine groups 133 and 134 has the four reverse-rotating tines 123 lapped at their proximal ends to one another to form generally parallel cross-shaped structures or crosses with reference to the center Pf of the rotor shaft.

In FIG. 8A, the first tine group 131 consists of the combination of: ① the first forward-rotating tine 121 extending in the traveling direction Ru (i.e., forward and upward) of the cultivator 10; ② the second forward-rotating tine 122 extending rearward and upward; ③ the first forward-rotating tine 121 extending rearward and downward; and ④ the second forward-rotating tine 122 extending forward and downward. The two first forward-rotating tines 121, 121 are shaped like a hatchet, being curved at their distal ends toward the second tine group 132 and also in the reverse-rotating direction R2. The two second forward-rotating tines 122, 122 are shaped like a hatchet, being curved at their distal ends toward the third tine group 133 and also in the reverse-rotating direction R2.

The second tine group 132 is formed symmetrically with the first tine group 131 and is arranged in the same phase with the first tine group 131.

The third tine group 133 is arranged with its phase shifted at about 45 degrees in the forward-rotating direction R1 with respect to the first tine group 131, consisting of the four reverse-rotating tines 123 extending forward, rearward, upward and downward. All the reverse-rotating tines 123 are shaped like a hatchet, being curved at their distal ends toward the first tine group 131 and also in the forward-rotating direction R1.

The fourth tine group 134 is formed symmetrically with the third tine group 133 and is arranged in the same phase with the third tine group 133.

As a matter of fact, the phases of the respective tine groups 131 to 134 are varied with the rotation of the rotor shaft 100 (See FIG. 6).

Now, the function of the cultivation power transmission mechanism 80 of the above configuration will be described with reference to FIGS. 2, 7 and 9 to 11.

In FIG. 2, the power of the engine 20 is transmitted from the output shaft 21, via the main clutch 30, the input shaft 51 of the transmission 50, the driving bevel gear 52, the first driven bevel gear 54 and the second driven bevel gear 72, to the transmission shaft 71.

Figure 9:
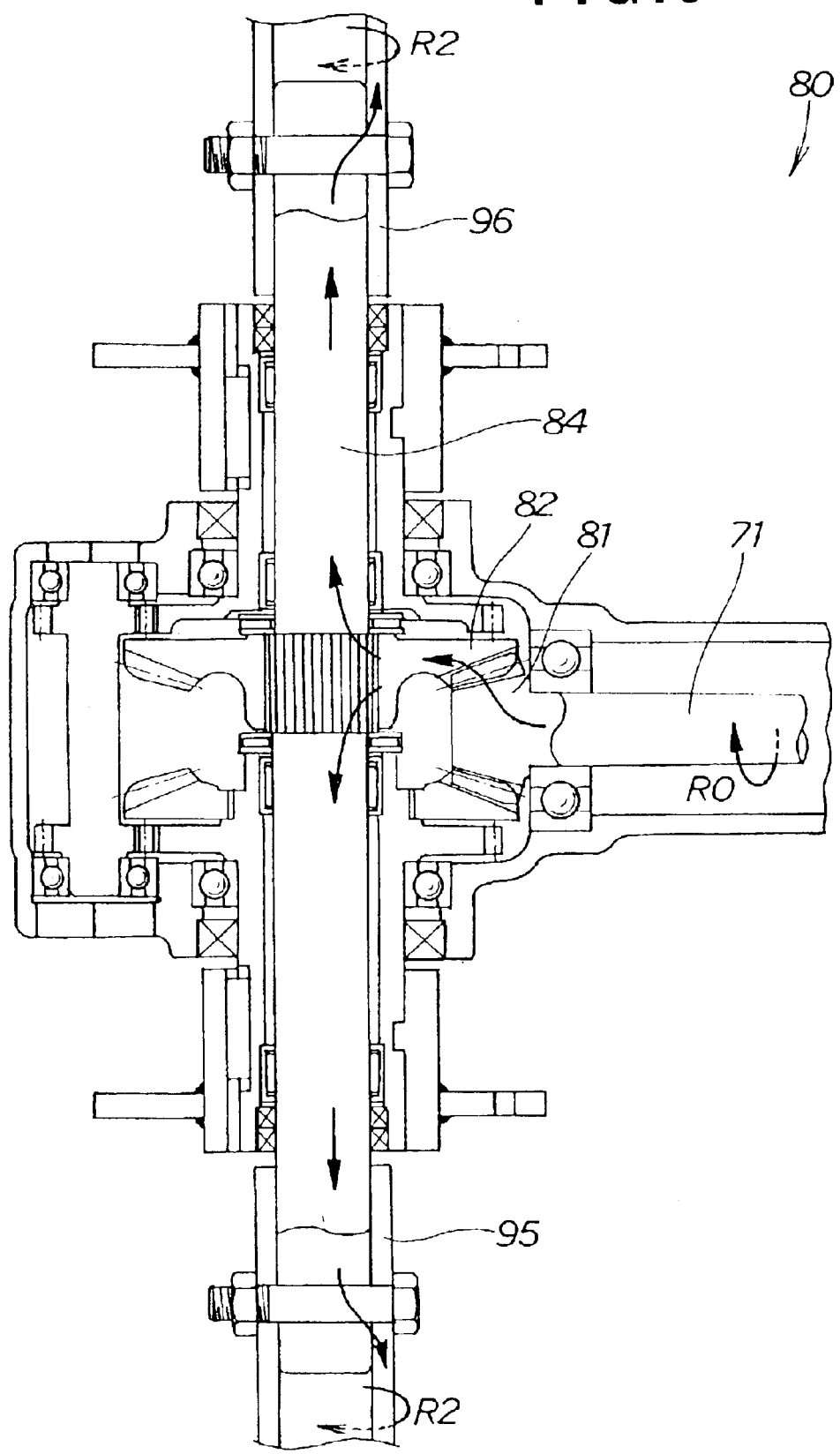
FIGS. 9, 10 and 11 are functional diagrams of a cultivation power transmission mechanism according to the invention.

In FIG. 9, when the transmission shaft 71 is rotated in a rotation direction R0 by the engine, the power of the engine is transmitted from the transmission shaft 71, via the first bevel gear 81, the second bevel gear 82 and the main rotor shaft 84, to the reverse-rotating left sleeve 95 and the reverse-rotating right sleeve 96. As a result, the reverse-rotating left and right sleeves 95 and 96 rotate in the reverse-rotating direction R2.

Figure 10:
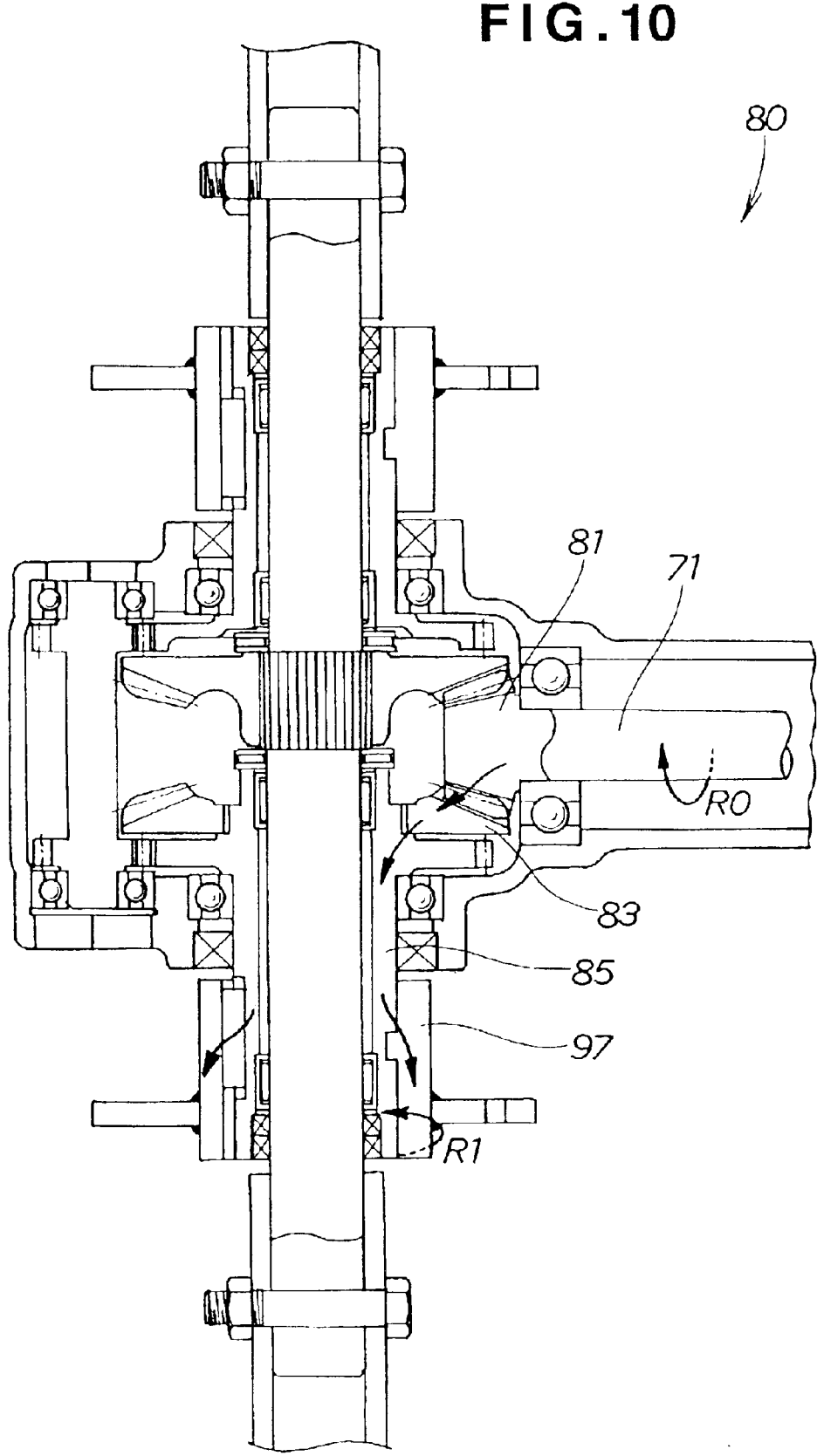

In FIG. 10, when the transmission shaft 71 is rotated in the rotation direction R0 by the engine, the power of the engine is also transmitted from the transmission shaft 71, via the first bevel gear 81, the third bevel gear 83 and the left hollow shaft 85, to the forward-rotating left sleeve 97. As a result, the forward-rotating left sleeve 97 rotates in the forward-rotating direction R1.

Figure 11:
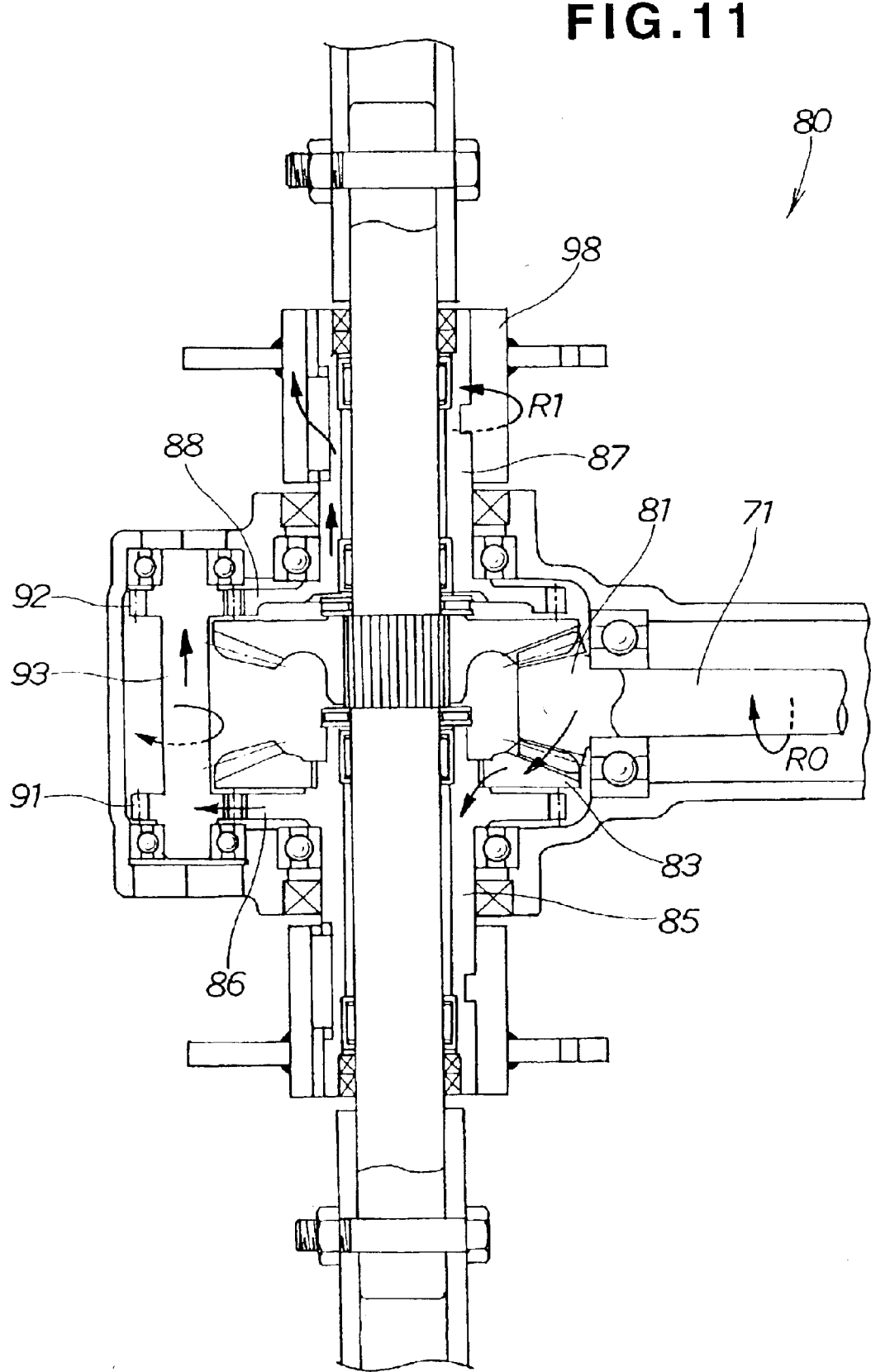

In FIG. 11, when the transmission shaft 71 is rotated in the rotation direction R0 by the engine, the power of the engine is also transmitted from the transmission shaft 71, via the first bevel gear 81, the third bevel gear 83, the left hollow shaft 85, the left gear 86, the counter left gear 91, the countershaft 93, the counter right gear 92, the right gear 88 and the right hollow shaft 87, to the forward-rotating right sleeve 98. As a result, the forward-rotating right sleeve 98 rotates in the forward-rotating direction R1.

Therefore, as shown in FIG. 7, the power of the engine 20 can be transmitted to rotate the reverse-rotating tines 123 attached to the reverse-rotating left and right sleeves 95 and 96 (the main rotor shaft 84 in FIG. 6) and the forward-rotating tines 121 and 122 attached to the forward-rotating left and right sleeves 97 and 98 (left and right hollow shafts 85 and 87 in FIG. 6) in opposite directions for cultivating operation.

Figure 12:
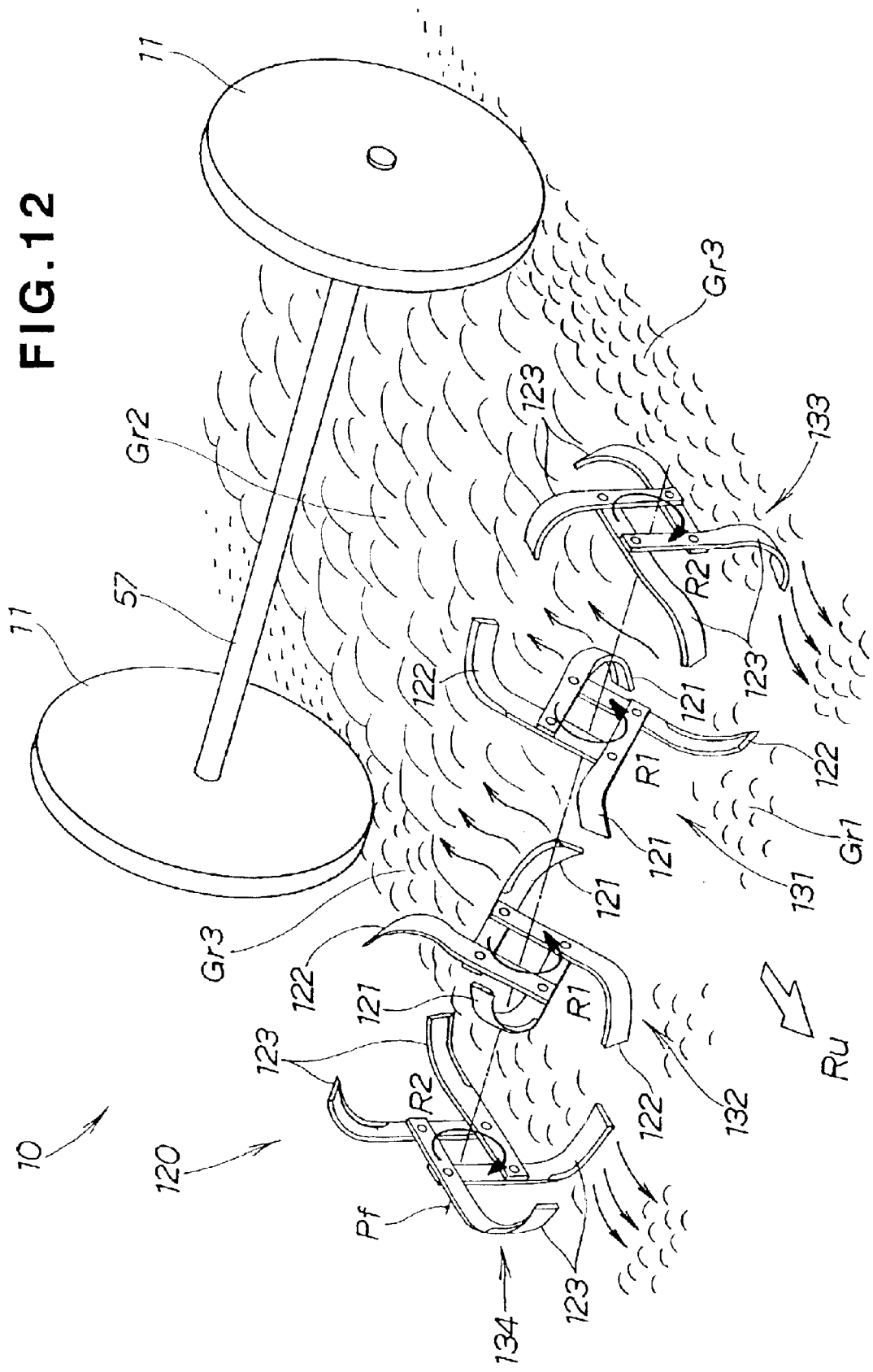
FIG. 12 is a functional diagram of the front-rotary cultivator according to the invention.

As shown in FIG. 12, the rotary working unit 120 in this embodiment is characterized in that the forward-rotating tines 121 and 122 of the tillage tines are arranged in the center of the body width and the reverse-rotating tines 123 are arranged transversely outward of the forward-rotating tines 121 and 122.

The forward-rotating tines 121 and 122 can be (forwardly) rotated in the forward-rotating direction R1 from the upper front of the traveling direction toward the ground Gr1. The reverse-rotating tines 123 can be (reversely) rotated in the reverse-rotating direction R2 from the upper rear of the traveling direction toward the ground Gr1.

The forward-rotating tines 121 and 122 and the reverse-rotating tines 123 during cultivation produce the cultivation reaction force. The direction of the cultivation reaction forces against the forward-rotating tines 121 and 122 is forward and upward of the traveling direction of the cultivator 10, that is, opposite to the rotation direction R1 of the forward-rotating tines 121 and 122. The direction of the cultivation reaction forces against the reverse-rotating tines 123 is rearward of the traveling direction of the cultivator 10, that is, opposite to the rotation direction R2 of the reverse-rotating tines 123. The cultivation reaction forces against the forward-rotating tines 121 and 122 and the cultivation reaction forces against the reverse-rotating tines 123 thus work in opposite directions.

If all the tillage tines are the forward-rotating tines 121 and 122, the cultivation reaction force is greater, making it difficult to prevent the occurrence of a dashing phenomenon due to the cultivation reaction force. According to the present embodiment, the cultivation reaction force arising from cultivation with the forward-rotating tines 121 and 122 can be cancelled to some extent by the cultivation reaction force arising from cultivation with the reverse-rotating tines 123. As a result, the occurrence of the dashing phenomenon due to the cultivation reaction force can be further prevented.

The rotary working unit 120 in this embodiment is further characterized in that the forward-rotating tines 121 and 122 are arranged in the same phase in a side view and the reverse-rotating tines 123 are arranged in the same phase in a side view.

With the cultivator 10 propelled, the forward-rotating tines 121 and 122 in the center of the body width can be forwardly rotated to simultaneously dig into the ground Gr1 for cultivation, thereby digging out the cultivated soil rearward of the cultivator body.

The reverse-rotating tines 123 arranged transversely outward of the forward-rotating tines 121 and 122 can be reversely rotated simultaneously with the rotation of the forward-rotating tines 121 and 122 to simultaneously dig into the ground Gr1, thereby digging out the cultivated soil forward of the cultivator body.

The simultaneous digging of the forward-rotating tines 121 and 122 into the ground Gr1 can increase the degree of digging as compared with differential digging. The simultaneous digging of the reverse-rotating tines 123 into the ground Gr1 can also increase the degree of digging. This results in an increase in the depth of plowing with the forward-rotating tines 121 and 122 and the reverse-rotating tines 123, further increasing cultivation performance.

Further, simultaneous digging of the forward-rotating tines 121 and 122 into the ground Gr1 can make the cultivation reaction forces against the forward-rotating tines 121 and 122 approximately equal. The same applies to the reverse-rotating tines 123. The approximately equal cultivation reaction forces allow further prevention of the unbalanced occurrence of a dashing phenomenon and also allow prevention of the occurrence of a pitching phenomenon (phenomenon in which the cultivator 10 swings back and forth like a seesaw).

The simultaneous digging of the forward-rotating tines 121 and 122 into the ground Gr1 with the simultaneous digging of the reverse-rotating tines 123 into the ground Gr1 can make approximately equal the left and right cultivation reaction forces acting on the cultivator 10. This also enables preventing the occurrence of a rolling phenomenon (phenomenon in which the cultivator 10 rolls around the longitudinal axis passing through the center of gravity of the cultivator 10). This can further prevent the snaking of the cultivator 10, increasing linearity in travel and steerage, further increasing the workability, and also improving cultivation finish.

Further, it is needless for the cultivator 10 of a light weight to increase the weight distribution to the tillage tines by disposing the engine or a heavy load such as a counterweight in front of or above the tillage tines so as to increase the degree of digging of the tillage tines to prevent a dashing phenomenon. In the operation of pushing down the operating handle 12 (See FIG. 1) to lift the tillage tines to turn the cultivator 10, the pushing-down force is not thus increased. This can reduce the workload of the operator, increasing steerage.

In general, when the driving wheels 11, 11 are arranged transversely outward of the rotary working unit 120 (tillage tines), the driving wheels 11, 11 pass over the uncultivated rough and hard ground Gr1. In this situation, the position of the cultivator 10 can largely vary, providing unstable cultivation. Further, since the tillage tines dig into the ground Gr1, the cultivator 10 leans forward.

When the driving wheels 11, 11 are arranged rearward of the forward-rotating tines 121 and 122, that is, rearward of the first and second tine groups 131 and 132, soil cultivated by the forward-rotating tines 121 and 122 is broken up rearward of the cultivator body and the driving wheels 11, 11 run over the ground Gr2 broken up and mounded. This makes the cultivator 10 lean forward.

With the rotary working unit 120 of this embodiment, the driving wheels 11, 11 are arranged rearward of the reverse-rotating tines 123 to dig out the cultivated soil forward of the cultivator body, that is, rearward of the third and fourth tine groups 133 and 134. The driving wheels 11, 11 can run over the ground Gr3 dug down by the reverse-rotating tines 123. This can increase the degree of settling of the driving wheels 11, 11 to maintain the cultivator 10 horizontally. Stable cultivation can thus be provided. Since the engine also has a horizontal position, the oil surface of a lubricant in the engine is not slanted. Thus smooth lubrication of the engine can be provided.

Figure 13:
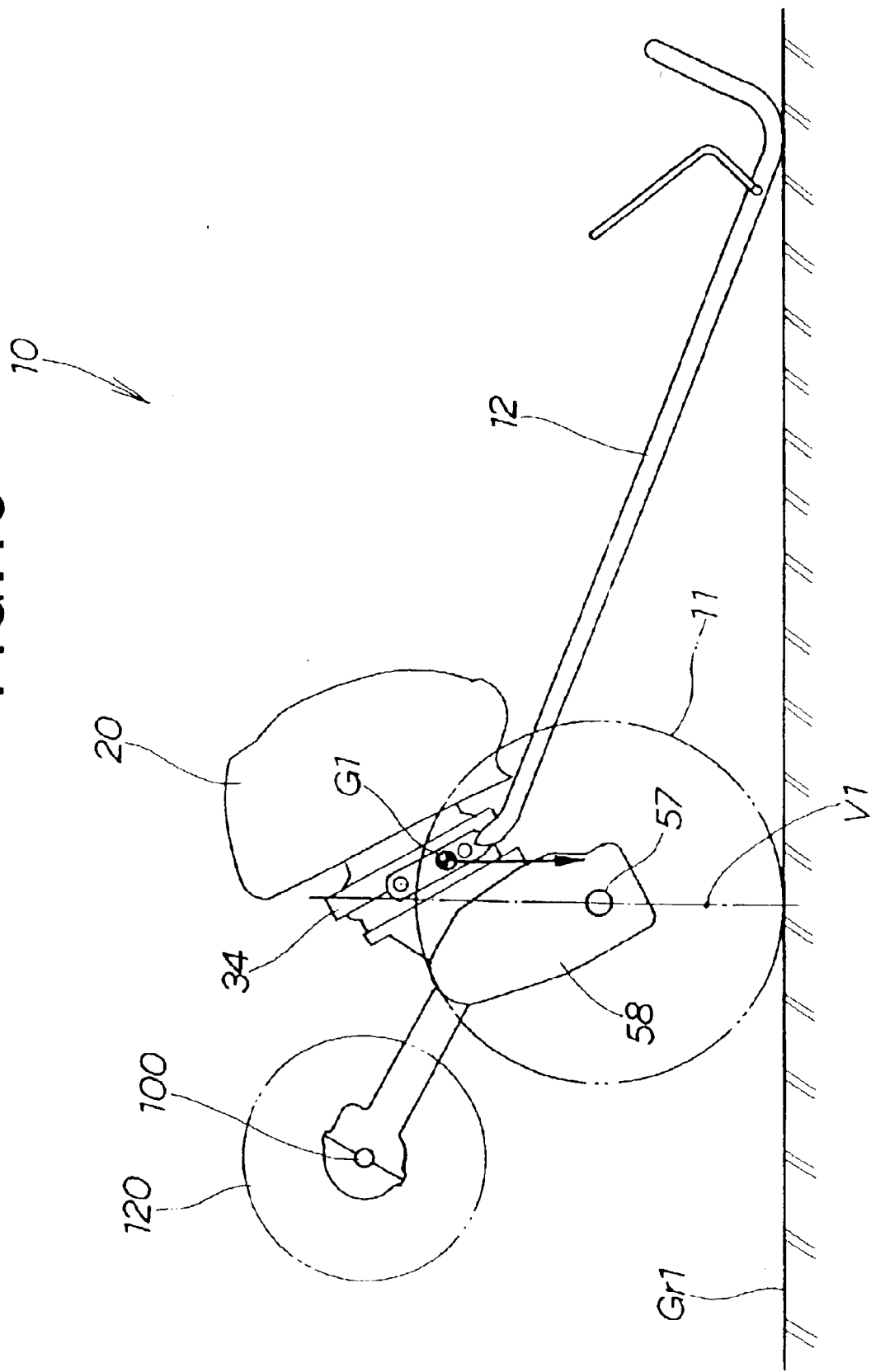
FIG. 13 is a diagram of the tilted state of the front-rotary cultivator according to the invention.

FIG. 13 illustrates the cultivator in this embodiment with the operating handle 12 placed on the ground Gr1.

The center of gravity G1 of the entire cultivator 10 is located slightly closer to the operating handle 12 than a vertical line V1 passing through the axle 57 when the operating handle 12 is placed on the ground Gr1 with rearward inclination. Placing the operating handle 12 on the ground Gr1 can thus maintain the rotary working unit 120 in a lifted state. With this lifted state, the rotary working unit 120 stationary or rotated can be cleaned, facilitating a cleaning operation.

Further, the engine 20 is, as shown in FIG. 1, a vertical engine with the cylinder 22 extended substantially horizontally forward. When the engine 20 is leaned rearward as shown in FIG. 13, the cylinder 22 is thus raised. The rearward leaning of the cultivator 10 will thus not cause the lubricant to enter the cylinder 22.

A modification of the rotary working unit 120 will be described with reference to FIGS. 14A, 14B, 14C and 15. Components identical to those in the rotary working unit 120 shown in FIGS. 7, 8 and 12 are attached the same reference numerals and will not be described.

Figures 14A, 14B, 14C:
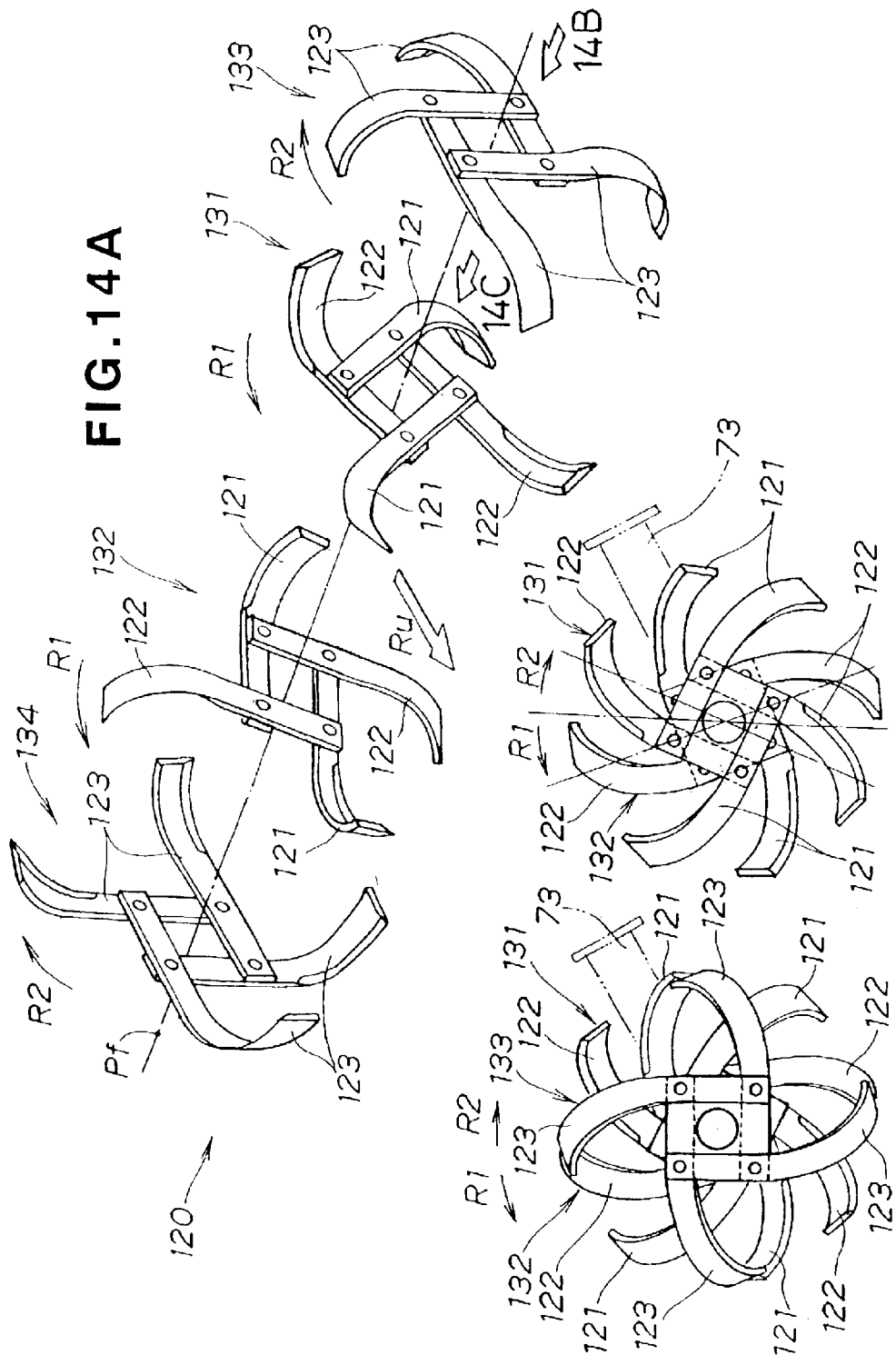
FIG. 14A is a perspective view illustrating a modification of the rotary working unit according to the invention.
FIG. 14B is a view taken from the direction of an arrow 14B in FIG. 14A.
FIG. 14C is a view taken from the direction of an arrow 14C in FIG. 14A.

In a rotary working unit 120 with the modification shown in FIG. 14A, only a plurality of reverse-rotating tines 123 are arranged in the same phase in a side view. This will be described in detail below.

A second tine group 132 is formed symmetrically with a first tine group 131 and is arranged with its phase shifted about 45 degrees toward a forward-rotating direction R1 relative to the first tine group 131. A third tine group 133 is, as shown in FIG. 14B, arranged with its phase shifted about 22.5 degrees toward the forward-rotating direction R1 relative to the first tine group 131. A fourth tine group 134 is formed symmetrically with the third tine group 133 and is arranged in the same phase with the third tine group 133.

In the rotary working unit 120 of this modification, the forward-rotating tines 121 and 122 are thus shifted in phase about 45 degrees from one another in a side view and the reverse-rotating tines 123 are arranged in the same phase in a side view.

As a matter of fact, the phases of the tine groups 131 to 134 vary with the rotation of a rotor shaft 100 (See FIG. 6).

Figure 15:
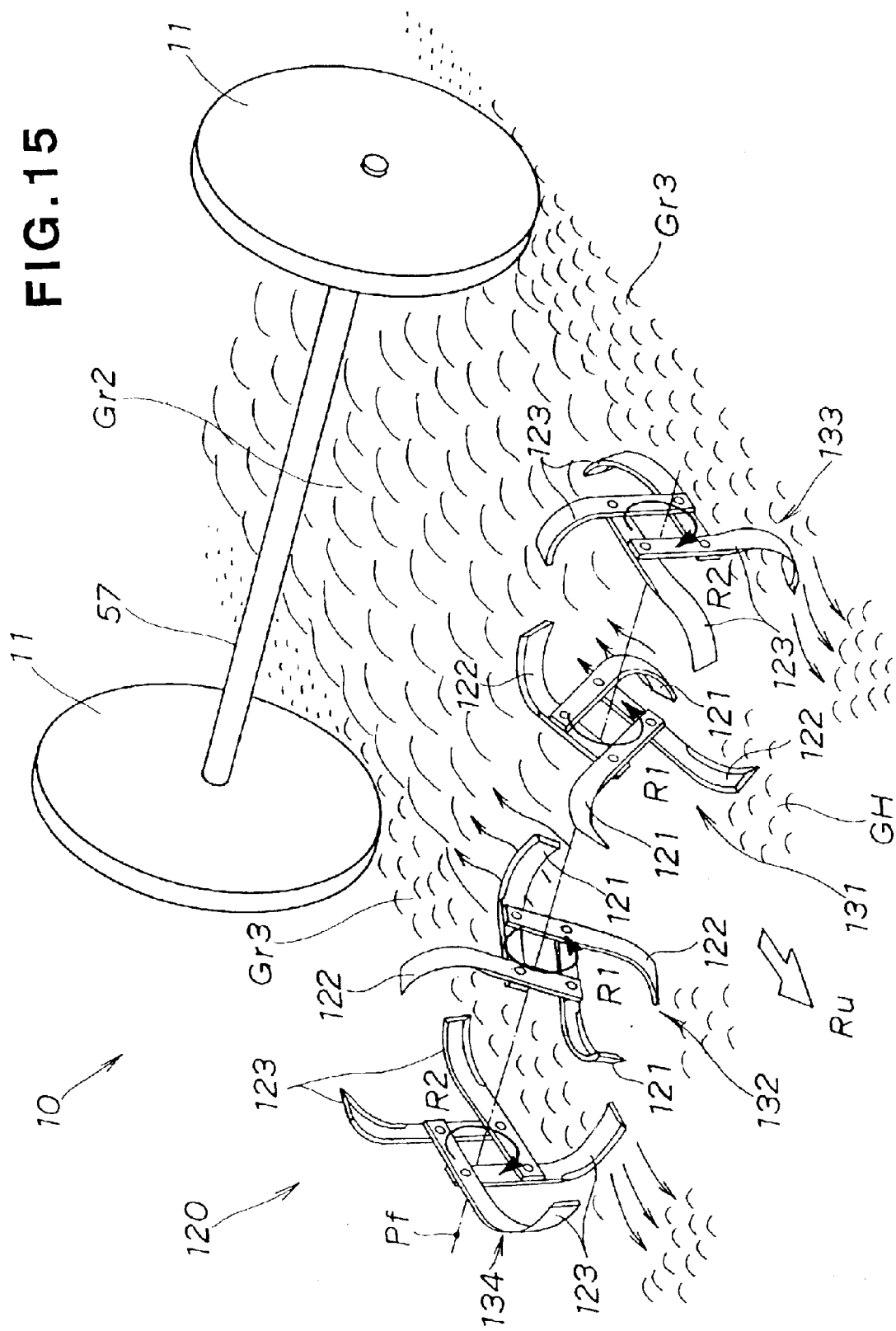
FIG. 15 is a functional diagram of a front-rotary cultivator with the modification shown in FIG. 14A.
Figure 16:
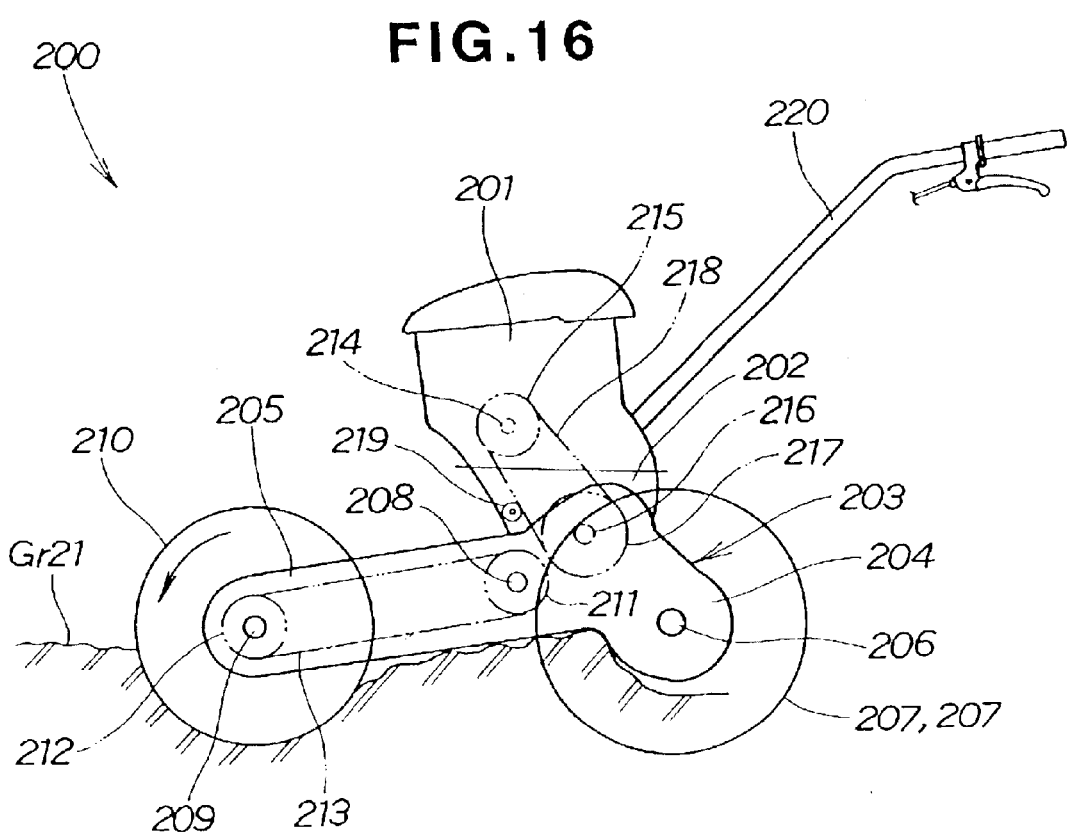
FIG. 16 is a schematic diagram of a conventional front-rotary cultivator.

As shown in FIG. 15, in a front-rotary cultivator 10 using the rotary working unit 120 of the modification, the forward-rotating tines 121 and 122 and the reverse-rotating tines 123 produce, during cultivation, cultivation reaction forces. The direction of the cultivation reaction forces against the forward-rotating tines 121 and 122 is forward and upward of the traveling direction of the cultivator 10, that is, opposite to a rotation direction R1 of the forward-rotating tines 121 and 122. The direction of the cultivation reaction forces against the reverse-rotating tines 123 is rearward of the traveling direction of the cultivator 10, that is, opposite to a rotation direction R2 of the reverse-rotating tines 123. The cultivation reaction forces against the forward-rotating tines 121 and 122 and the cultivation reaction forces against the reverse-rotating tines 123 thus act in opposite directions.

According to this modification, the cultivation reaction forces arising from cultivation with the forward-rotating tines 121 and 122 can be cancelled to some extent by the cultivation reaction forces arising from cultivation with the reverse-rotating tines 123. This results in further prevention of occurrence of a dashing phenomenon due to the cultivation reaction forces.

Further, with the cultivator 10 propelled, the forward-rotating tines 121 and 122 located in the center of the body width can forwardly rotate to dig into the ground Gr1 for cultivation, digging out the cultivated soil rearward of the cultivator body.

Furthermore, the reverse-rotating tines 123 arranged transversely outward of the forward-rotating tines 121 and 122 can reversely rotate simultaneously with the rotation of forward-rotating tines 121 and 122 to simultaneously dig into the ground Gr1, digging out the cultivated soil forward of the cultivator body.

The simultaneous digging of the reverse-rotating tines 123 into the ground Gr1 can increase the degree of digging as compared with differential digging. This results in an increase in the depth of plowing with the reverse-rotating tines 123, further increasing cultivation performance.

The simultaneous digging of the reverse-rotating tines 123 into the ground Gr1 can also make the reaction forces against the reverse-rotating tines 123 approximately equal to one another. The approximately equal cultivation reaction forces can prevent the unbalanced occurrence of a dashing phenomenon and can also prevent the occurrence of a pitching phenomenon (phenomenon in which the cultivator 10 swings back and forth like a seesaw). This can thus prevent the snaking of the cultivator 10, increasing its linearity in travel, steerage and workability, and also improving cultivation finish.

The present disclosure relates to the subject matter of Japanese Patent Application No. 2002-008013, filed Jan. 16, 2002, and the subject matter of Japanese Patent Application No. 2002-311020, filed October 25, the disclosures of which are expressly incorporated herein by reference in their entireties.

What is claimed is:

1. A walk-behind cultivator comprising: a body having a front end; an engine mounted on the body; a plurality of driving wheels disposed on the body and driven by the engine; and a rotary working unit rotatably mounted on the front end of the body and driven by the engine, the rotary working unit having a plurality of forward-rotating tine assemblies mounted for undergoing rotation about a rotational axis and disposed centrally of the body in a width direction thereof, each of the forward-rotating tine assemblies having a plurality of tines directly connected together at proximal ends thereof, and at least one pair of reverse-rotating tine assemblies mounted for undergoing rotation about the rotational axis and disposed transversely outward of the forward-rotating tine assemblies, each of the reverse-rotating tine assemblies having a plurality of tines directly connected together at proximal ends thereof, and the reverse-rotating tine assemblies being arranged in the same phase with respect to each other around the rotational axis.

2. A walk-behind cultivator according to claim 1; wherein the forward-rotating tine assemblies are arranged in the same phase with respect to each other around the rotational axis.

3. A walk-behind cultivator according to claim 1; wherein each of the driving wheels is disposed directly behind a respective one of the reverse-rotating tine assemblies.

4. A walk-behind cultivator according to claim 1; wherein the plurality of forward-rotating tine assemblies comprises two forward-rotating tine assemblies disposed symmetrically with respect to a longitudinal centerline of the body.

5. A walk-behind cultivator according to claim 1; wherein the plurality of rearward-rotating tine assemblies comprises two rearward-rotating tine assemblies disposed symmetrically with respect to a longitudinal centerline of the body.

6. A walk-behind cultivator according to claim 5; wherein the plurality of forward-rotating tine assemblies comprises two forward-rotating tine assemblies disposed symmetrically with respect to a longitudinal centerline of the body.

7. A walk-behind cultivator according to claim 1; wherein the plurality of tines of each of the forward-rotating tine assemblies comprises four tines lapped at proximal ends thereof to one another to form generally parallel cross-shaped structures surrounding a rotational axis of the forward-rotating tine assembly.

8. A walk-behind cultivator according to claim 1; wherein the plurality of tines of each of the reverse-rotating tine assemblies comprises four tines lapped at proximal ends thereof to one another to form generally parallel cross-shaped structures surrounding a rotational axis of the reverse-rotating tine assembly.

9. A walk-behind cultivator according to claim 8; wherein the plurality of tines of each of the forward-rotating tine assemblies comprises four tines lapped at proximal ends thereof to one another to form generally parallel cross-shaped structures surrounding a rotational axis of the forward-rotating tine assembly.

10. A walk-behind cultivator according to claim 9; wherein the forward-rotating tine assemblies are arranged in the same phase with respect to each other around the rotational axis thereof.

11. A walk-behind cultivator according to claim 10; wherein the plurality of forward-rotating tine assemblies comprises two forward-rotating tine assemblies disposed symmetrically with respect to a longitudinal centerline of the body; and wherein the plurality of rearward-rotating tine assemblies comprises two rearward-rotating tine assemblies disposed symmetrically with respect to the longitudinal centerline of the body.

12. A walk-behind cultivator according to claim 9; wherein the forward-rotating tine assemblies are arranged 45 degrees out of phase with respect to one another around the rotational axis thereof.

13. A walk-behind cultivator according to claim 12; wherein the plurality of forward-rotating tine assemblies comprises two forward-rotating tine assemblies disposed symmetrically with respect to a longitudinal centerline of the body; and wherein the plurality of rearward-rotating tine assemblies comprises two rearward-rotating tine assemblies disposed symmetrically with respect to the longitudinal centerline of the body.

* * * * *